Patented July 3, 1923.

1,460,510

UNITED STATES PATENT OFFICE.

SALIM F. ZALOOM, OF NEW YORK, N. Y., ASSIGNOR TO ROYAL NUT COMPANY, A CORPORATION OF NEW YORK.

PRESERVING COMPOUND FOR PISTACHIO NUTS.

No Drawing.  Application filed June 21, 1922. Serial No. 569,972.

REISSUED

*To all whom it may concern:*

Be it known that I, SALIM F. ZALOOM, a subject of Turkey, residing at New York, in the county of New York and State of New York, have invented certain new and useful Improvements in Preserving Compounds for Pistachio Nuts; and I do hereby declare the following to be a full, clear, and exact description of the invention, such as will enable others skilled in the art to which it appertains to make and use the same.

This invention relates to the art of preserving foods and more particularly to the art of preserving pistachio nuts.

I have found that when gum arabic and salt are combined in certain proportions, the pistachio nuts not only firmly retain the salt but that the shells take on a dull white appearance in contrast to the shiny appearance which obtains when salt alone is used. This dull white finish or coating not only gives the nuts an attractive appearance but also assists in preserving the same, inasmuch as this coating consists of minute salt crystals.

The formula for preparing the compound is substantially as follows:

2 pounds pure gum arabic
100 pounds salt (sodium chloride)
40 gallons of water in which the salt and gum arabic are boiled.

The above quantity is sufficient for application to 1,000 pounds of pistachio nuts. The nuts are sprayed with the above liquid while they are in the roaster, the heat of the roaster drying the nuts so that no separate drying process is necessary.

What is claimed is:

1. A compound for treating pistachio nuts consisting of sodium chloride and gum arabic in aqueous solution.

2. A compound for treating pistachio nuts which consists of 100 pounds of sodium chloride, 2 pounds gum arabic in an aqueous solution.

3. A compound for application to pistachio nuts comprising the following ingredients in substantially the proportions specified, namely, 100 pounds sodium chloride, 2 pounds gum arabic and 40 gallons of water.

4. The method of treating pistachio nuts which consists of spraying them with an aqueous solution of sodium chloride and gum arabic while the nuts are passing through a roaster.

In testimony whereof I affix my signature.

SALIM F. ZALOOM.